US010919729B2

(12) United States Patent
Loh (10) Patent No.: US 10,919,729 B2
(45) Date of Patent: Feb. 16, 2021

(54) SELF-RETRACTABLE COILED ELECTRICAL CABLE (71) Applicant: Halliburton Energy Services, Inc., Houston, TX (US)

(72) Inventor: Kar Ki Loh, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 211 days.

(21) Appl. No.: 15/516,928

(22) PCT Filed: Nov. 17, 2014

(86) PCT No.: PCT/US2014/065892
§ 371 (c)(1),
(2) Date: Apr. 5, 2017

(87) PCT Pub. No.: WO2016/080946
PCT Pub. Date: May 26, 2016

(65) Prior Publication Data
US 2017/0291790 A1 Oct. 12, 2017

(51) Int. Cl.
*H01B 7/06* (2006.01)
*B65H 75/36* (2006.01)
(Continued)

(52) U.S. Cl.
CPC ............ *B65H 75/36* (2013.01); *E21B 17/028* (2013.01); *E21B 23/00* (2013.01); *E21B 47/12* (2013.01);
(Continued)

(58) Field of Classification Search
CPC ... B65H 75/36; B65H 2701/34; E21B 17/028; E21B 17/073; E21B 23/00; E21B 47/12;
(Continued)

(56) References Cited

U.S. PATENT DOCUMENTS 3,823,253 A   7/1974  Walters et al.
4,313,645 A   2/1982  Cocco et al.
(Continued)

FOREIGN PATENT DOCUMENTS

DE    19645869 A1 * 5/1998 ........... G06K 19/041
WO    9103818      3/1991
(Continued)

OTHER PUBLICATIONS

International Patent Application No. PCT/US2014/065892, International Search Report and Written Opinion dated Jul. 24, 2015, 12 pages.

*Primary Examiner* — Robert E Fuller
*Assistant Examiner* — Lamia Quaim
(74) *Attorney, Agent, or Firm* — Kilpatrick Townsend & Stockton LLP (57) ABSTRACT

A self-retracting coiled cable having a variable length along a center line can include an outer insulator sleeve having a longitudinal axis. The self-retracting coiled cable can also include a spring material extending along the longitudinal axis of the outer insulator sleeve. The spring material can hold the outer insulator sleeve in a helical shape around the center line. The spring material can also allow the self-retracting coiled cable to expand upon an application of an axial force to an end of the self-retracting coiled cable, thereby increasing a length of the self-retracting coiled cable, and to retract upon a removal of the axial force from the end of the self-retracting coiled cable, thereby reducing the length of the self-retracting coiled cable. The self-retracting coiled cable can further include multiple wires extending along the longitudinal axis of the outer insulator sleeve and disposed symmetrically around the spring material.

20 Claims, 8 Drawing Sheets (51) Int. Cl.
    *E21B 17/20*     (2006.01)
    *H01B 7/00*     (2006.01)
    *H02G 11/00*     (2006.01)
    *H01B 7/04*     (2006.01)
    *E21B 23/00*     (2006.01)
    *E21B 17/02*     (2006.01)
    *E21B 47/12*     (2012.01)

(52) U.S. Cl.
    CPC ............ *H01B 7/0009* (2013.01); *H01B 7/046* (2013.01); *H02G 11/003* (2013.01); *B65H 2701/34* (2013.01); *H01B 7/065* (2013.01)

(58) Field of Classification Search
    CPC ...... H01B 7/0009; H01B 7/046; H01B 7/065; H01B 11/04; H01B 7/08; H01B 7/0072; H02G 11/003
    See application file for complete search history.

(56) References Cited

U.S. PATENT DOCUMENTS

| | | | |
|---|---|---|---|
| 4,453,036 A | 6/1984 | Neuroth | |
| 4,675,474 A | 6/1987 | Neuroth | |
| 4,683,349 A | 7/1987 | Takebe | |
| 4,861,945 A | 8/1989 | Buck et al. | |
| 4,988,833 A | 1/1991 | Lai et al. | |
| 5,763,836 A | 6/1998 | Anastasi et al. | |
| 5,777,273 A | 7/1998 | Woody et al. | |
| 6,396,414 B1 | 5/2002 | Bickford et al. | |
| 6,448,501 B1 * | 9/2002 | McIntyre | H01B 12/16 174/125.1 |
| 6,857,486 B2 | 2/2005 | Chitwood et al. | |
| 6,963,032 B2 | 11/2005 | Yamaguchi et al. | |
| 7,569,774 B2 * | 8/2009 | Huston | G02B 6/443 174/120 R |
| 7,592,544 B2 | 9/2009 | Carscallen, II et al. | |
| 8,291,941 B1 | 10/2012 | Berardi | |
| 8,563,860 B1 * | 10/2013 | Ramos, Jr. | H01B 7/065 174/69 |
| 2009/0078430 A1 * | 3/2009 | Du | E21B 17/1035 166/380 |
| 2010/0006320 A1 | 1/2010 | Tatsumi | |
| 2010/0139661 A1 | 6/2010 | Landis | |
| 2010/0300698 A1 | 12/2010 | Bedouet et al. | |
| 2011/0088925 A1 | 4/2011 | Tatsumi et al. | |
| 2012/0285723 A1 | 11/2012 | Gundel et al. | |
| 2014/0034382 A1 | 2/2014 | Mateski et al. | |
| 2014/0144696 A1 | 5/2014 | Nagahashi | |
| 2014/0196893 A1 * | 7/2014 | Vigneaux | C09K 8/72 166/250.07 |
| 2015/0279515 A1 * | 10/2015 | Huang | A61L 31/041 174/72 A |
| 2016/0215579 A1 * | 7/2016 | Van Der Ende | E21B 23/14 |

FOREIGN PATENT DOCUMENTS

| | | |
|---|---|---|
| WO | 2008138161 | 11/2008 |
| WO | 2013161730 | 10/2013 |

\* cited by examiner

FIG. 7

SELF-RETRACTABLE COILED ELECTRICAL CABLE

CROSS-REFERENCE TO RELATED APPLICATIONS

This is a U.S. national phase under 35 U.S.C. 371 of International Patent Application No. PCT/US2014/065892 titled "Self-Retractable Coiled Electrical Cable" and filed Nov. 17, 2014, the entirety of which is incorporated herein by reference.

TECHNICAL FIELD

The present disclosure relates generally to devices for use in well systems. More specifically, but not by way of limitation, this disclosure relates to a self-retractable coiled electrical cable for use in a wellbore.

BACKGROUND

A well system (e.g., an oil or gas well for extracting fluids or gas from a subterranean formation) can include a well tool in a wellbore. The well tool may include components that expand and contract to perform mechanical functions. For example, the well tool may include a linear actuator configured to expand and contract in order to move a motor module coupled to the linear actuator.

The well tool can include one or more electrical cables for transmitting electrical power between various components in the well tool. To accommodate well tool components that expand and contract, it may be desirable to use electrical cables that can expand and contract. Traditional retractable electrical cables, however, can lose their ability to retract in high downhole temperatures and/or other challenging environments.

DETAILED DESCRIPTION

Certain aspects and features of the present disclosure are directed to a self-retractable electrical cable with a coiled (e.g., helical) shape. The self-retractable coiled electrical cable ("retractable cable") can include a spring material that may extend along a longitudinal axis of the retractable cable. The spring material may allow the retractable cable to (i) longitudinally expand upon an application of an axial force to an end of the retractable cable, thereby increasing the length of the retractable cable, and (ii) longitudinally retract upon a removal of the axial force from the end of the retractable cable, thereby reducing the length of the retractable cable.

The retractable cable can also include multiple wires extending along the longitudinal axis of the retractable cable. The wires may transmit power or communication signals through the retractable cable. Each of the wires can include a conductor. In some examples, each of the wires can include an insulator positioned around the conductor.

The wires can be disposed symmetrically around the spring material. For example, the wires may be positioned in a circular configuration around the spring material, with each wire equidistant from the spring material. As another example, the wires may be positioned in a flat, single-row configuration, with an equal number of wires on either side of the spring material.

The spring material in the retractable cable can be relatively unaffected by high temperatures (e.g., temperatures greater than 100° C.). This can allow the retractable cable to expand and contract in high temperatures, unlike traditional retractable cables. Traditional retractable may rely on a helically-shaped outer insulator sleeve, rather than an internal spring material, to be able to expand and contract. Because high temperatures can cause the molecules in the outer insulator sleeve to realign, the outer insulator sleeve can lose its "spring memory" in high temperatures. This may render traditional retractable cables unable to expand and retract, or only able to minimally expand and retract (e.g., expand by less than 20% of the original size), in high temperatures.

In some examples, the spring material may allow the retractable cable to have a longer lifespan than a traditional retractable cable. This is because the spring material may be able to expand and contract more times, without its shape distorting, than the outer insulator sleeve of a traditional retractable cable.

In some examples, the retractable cable may be positioned in a well system or another high-temperature environment. For example, the retractable cable may be included in well tool, such as a linear actuator. A first longitudinal end of the retractable cable can be coupled to a first end of the well tool, and a second longitudinal end of the retractable cable can be coupled to a second end of the well tool. A well operator may be able to operate the well tool to cause the well tool to expand. As the well tool expands, the first end of the well tool and the second end of the well tool may move apart from one another, thereby pulling the retractable cable from opposite ends. This may cause the retractable cable to longitudinally expand. The well operator may also be able to cause the well tool to contract. As the well tool contracts, the first end of the well tool and the second end of the well tool may move toward each other, thereby removing the pulling forces from the retractable cable. This may cause the retractable cable to longitudinally contract. The capability of the retractable cable to expand and contract can prevent the retractable cable from tearing or breaking under the pulling tension generated by the well tool.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Figure 1:
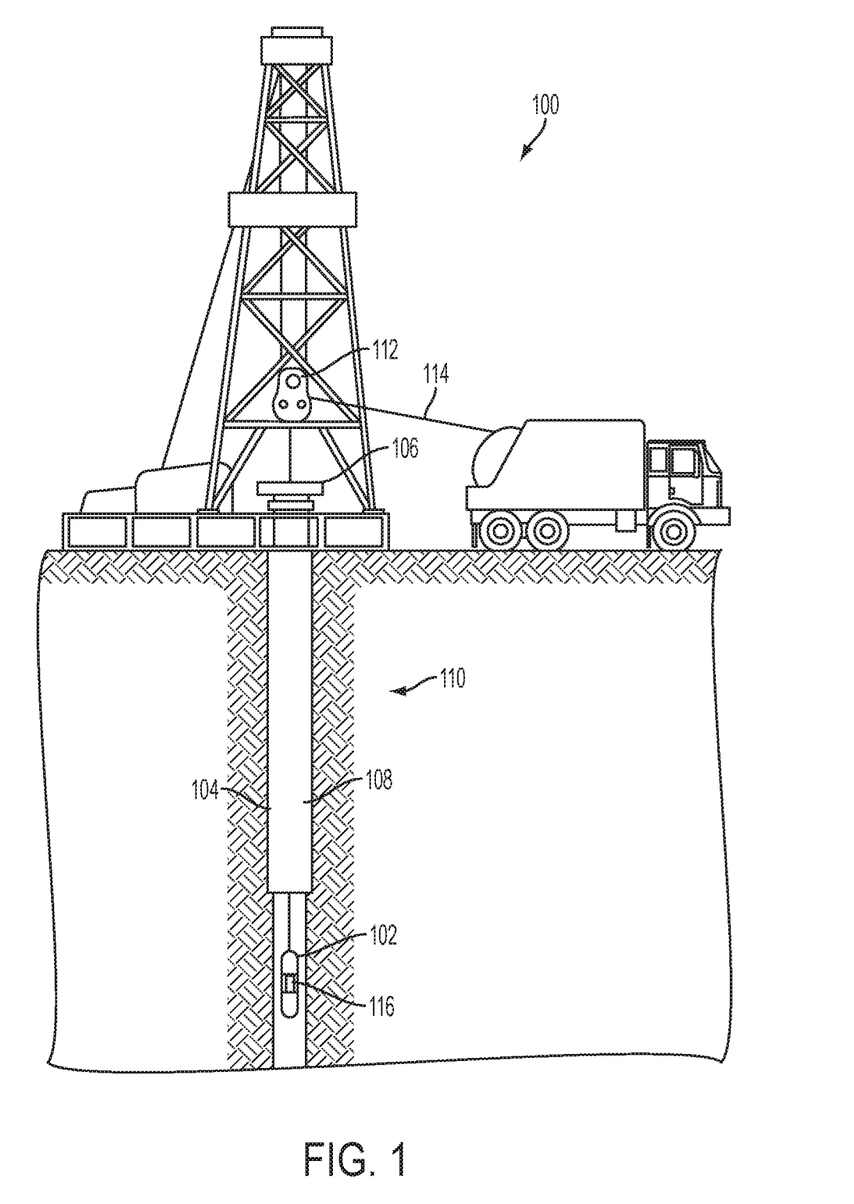
FIG. 1 is a diagram showing a cross-sectional side view of a well system that includes a self-retractable coiled electrical cable according to one example.

FIG. 1 is a cross-sectional view of a well system 100 that includes a self-retractable coiled electrical cable 116 according to one aspect of the present disclosure. The well system 100 includes a wellbore 108 extending through various earth strata. The wellbore 108 extends through a hydrocarbon bearing subterranean formation 110. A casing string 104 extends from the surface 106 to the subterranean formation 110. The casing string 104 may provide a conduit via which formation fluids, such as production fluids produced from the subterranean formation 110, can travel from the wellbore 108 to the surface 106.

The well system 100 may also include at least one well tool 102. The well tool 102 may include a linear actuator, motor module, milling module, tube-cutting module, and/or key-shifting module. The well tool 102 may be coupled to a wireline 114 or coiled tube that can be deployed into the wellbore 108, for example, using a winch 112.

The well tool 102 may include a retractable cable 116. The retractable cable 116 may be configured to longitudinally expand in response to a force being applied to one or both longitudinal ends of the retractable cable 116. The retractable cable 116 may be configured to longitudinally retract in response to the force being removed from one or both longitudinal ends of the retractable cable 116.

Figure 2A:
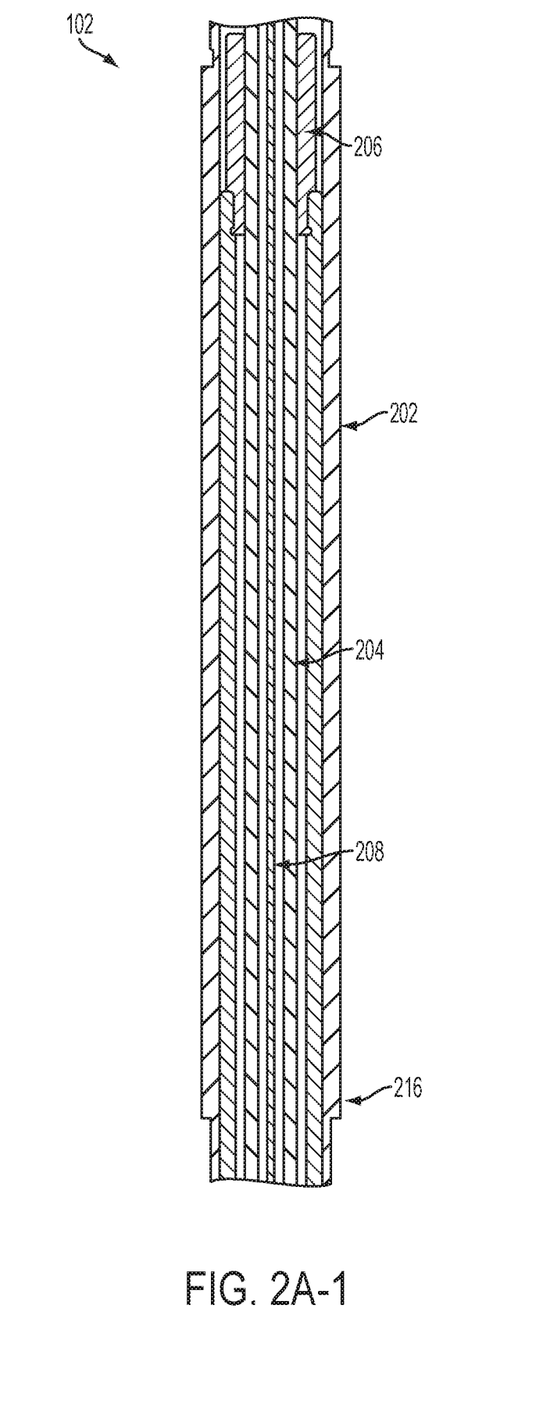
FIG. 2A is a diagram showing a cross-sectional side view of a portion of a well tool that includes a self-retractable coiled electrical cable that is retracted according to one example.
FIG. 2B is a diagram showing a cross-sectional side view of the well tool of FIG. 2A in which the well tool and the self-retractable coiled electrical cable are expanded according to one example.
Figure 2A:
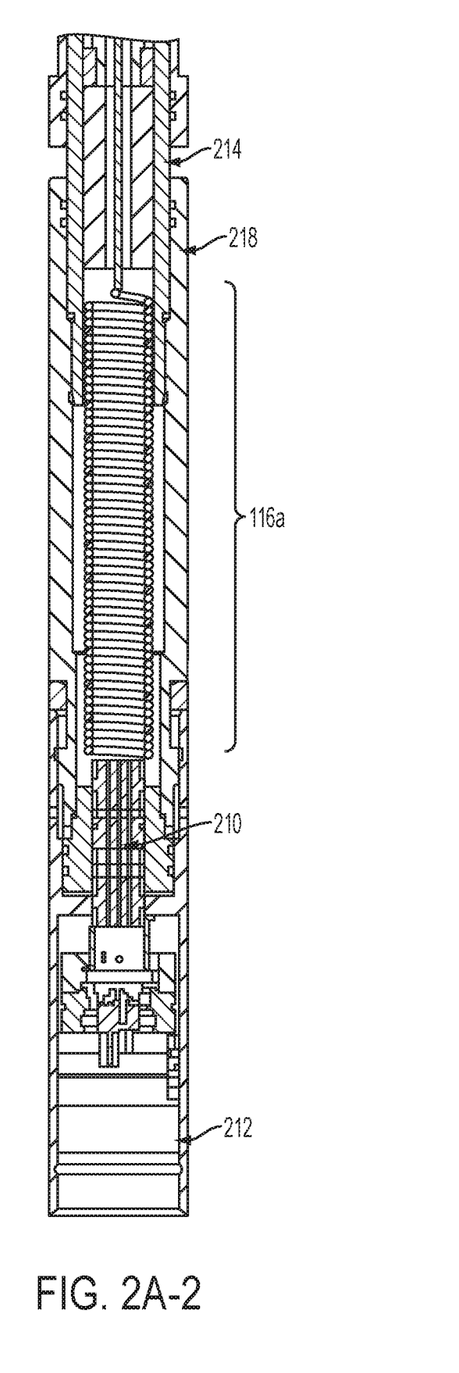
Figure 2B:
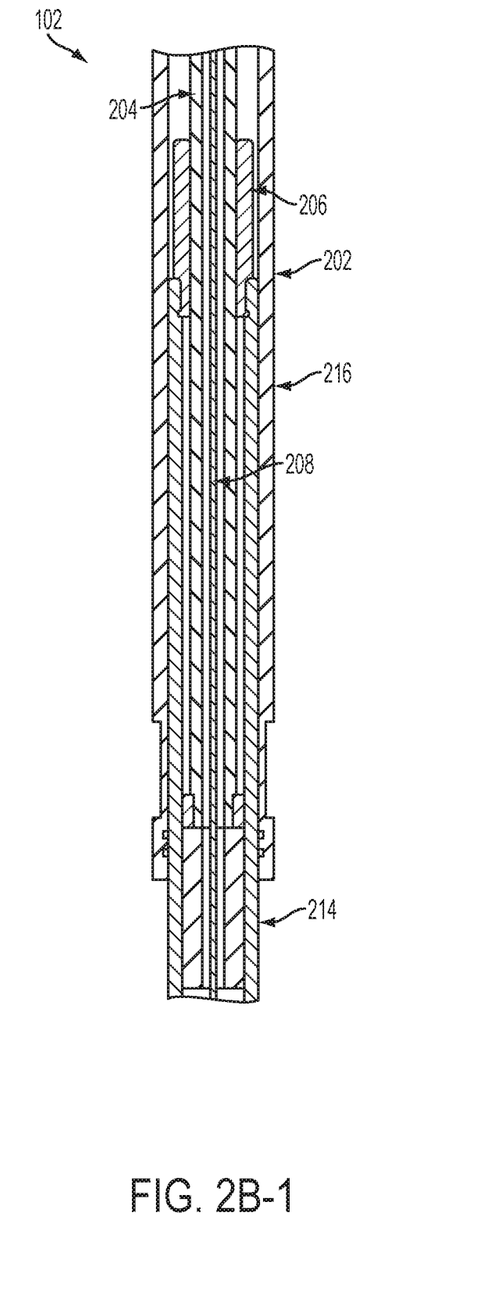
Figure 2B:
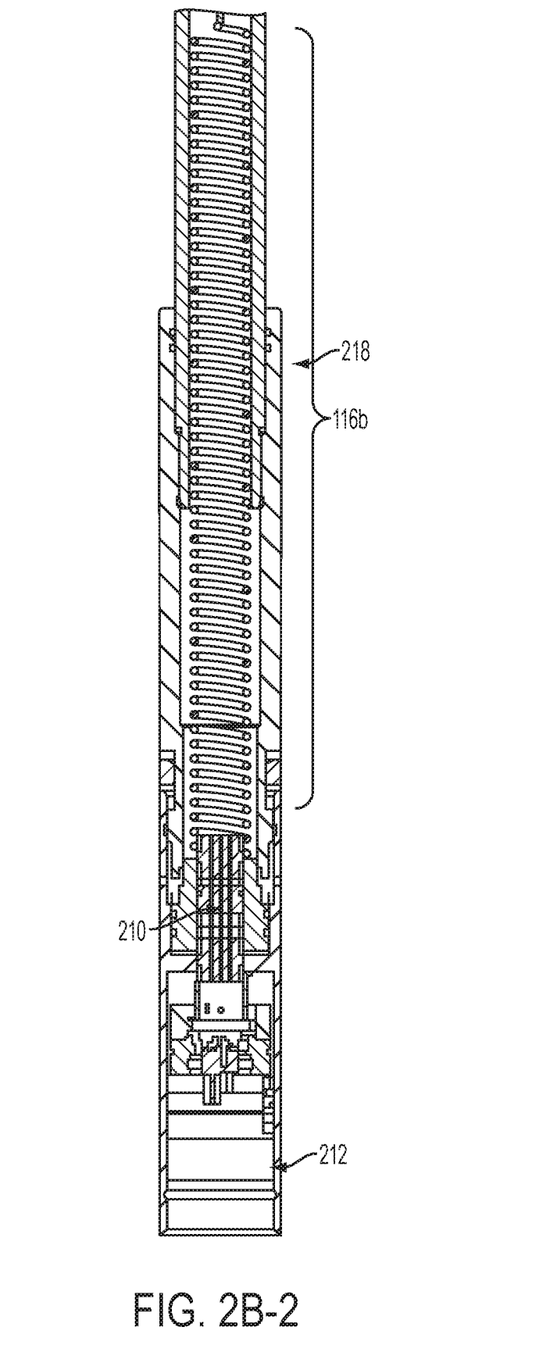

FIG. 2A is a cross-sectional side view of a portion of a well tool 102 that includes a self-retractable coiled electrical cable 116a that is retracted according to one example. The well tool 102 may be (or may include) a linear actuator.

The well tool 102 includes a housing 202. A wire 208 may extend through the housing 202 (e.g., through a ball screw 204) and may be coupled to one longitudinal end of the retractable cable 116a. The retractable cable 116 may include a helical shape. The other longitudinal end of the retractable cable 116a may be coupled to a downhole connector 210. The downhole connector 210 may be configured to couple with another well tool 212 (e.g., a linear actuator, motor module, milling module, tube-cutting module, and/or key-shifting module). In some examples, power or communication signals (e.g., analog or digital signals for transmitting data or information) may be transmitted between well components (e.g., the well tools 102, 212) via the wire 208 and retractable cable 116.

In some examples, the well tool 102 may include a ball screw 204 positioned within the housing 202. The ball screw 204 may be coupled to a ball nut 206. The well tool 102 may operate to cause the ball screw 204 to longitudinally advance through the ball nut 206. As the ball screw 204 advances through the ball nut 206, the ball nut 206 may move downwards. The downwards motion of the ball nut 206 may push an interior mandrel 214 downwards with respect to the housing 202. This may cause a first portion 216 of the well tool 102 to separate from a second portion 218 of the well tool 102, thereby expanding the well tool 102 (e.g., as shown in FIG. 2B). As the well tool 102 expands, force is applied to one or both longitudinal ends of the retractable cable 116a, which can cause the retractable cable 116a to expand. An example of an expanded retractable cable 116b is shown in FIG. 2B.

Figure 3:
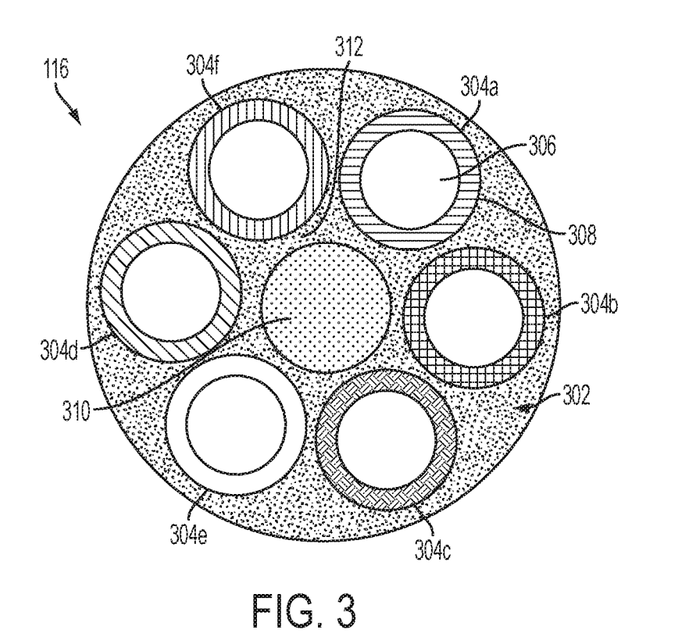
FIG. 3 is a diagram showing a cross-sectional end view of a self-retractable coiled electrical cable according to one example.

FIG. 3 is a cross-sectional end view of a self-retractable coiled electrical cable 116 according to one example. The retractable cable 116 may include an outer insulator sleeve 302. The outer insulator sleeve 302 may include any suitable insulator material. For example, the outer insulator sleeve 302 may include rubber, plastic, or polyvinyl chloride (PVC). In some examples, the outer insulator sleeve 302 may be a heat shrink tube or a pre-molded insulator sleeve.

Multiple wires 304a-f may be positioned within the outer insulator sleeve 302. The wires 304a-f may extend through the longitudinal length (e.g., longitudinal axis) of the retractable cable 116. Each of the wires 304a-f may include a conductor 306. The conductor 306 can include any suitable conductive material. For example, the conductor 306 may include copper, tin, iron, silver, gold, and/or lead. Each of the wires 304a-f may also include an insulator 308. The insulator 308 can be positioned around the conductor 306. For example, the insulator 308 may be positioned around the outer circumference of and directly contacting the of the conductor 306. The insulator 308 can include any suitable insulator material. For example, the insulator 308 may include rubber, plastic, and/or PVC.

The retractable cable 116 may include a spring material 310. The spring material 310 may be positioned in the cross-sectional center of the longitudinal end of the retractable cable 116. The spring material 310 can include any suitable spring material. For example, the spring material 310 may include stainless steel (SS) 316, polyetherketone (PEEK), music wire, chrome vanadium, SS 302, and/or SS 17-7. The diameter of the spring material 310 may be based on a property of the spring material 310 (e.g., the spring constant), the outer insulator sleeve 302, and/or the wires 304. For example, the diameter of the spring material 310 may be configured such that there is sufficient spring material 310 to overcome the rigidity of the outer insulator sleeve 302 and/or the wires 304a-f. This may allow the retractable cable 116 to effectively expand and contract.

The wires 304a-f may be positioned in a balanced (e.g., symmetrical) configuration around a spring material 310. For example, each of the wires 304a-f may be equidistantly spaced from (and around) the spring material 310. In some examples, the outer circumference of the wires 304a-f (e.g., the outer circumference of the insulators 308 around the wires 304a-f) may contact the spring material 310. In other examples, a space 312 may be positioned between each of the wires 304a-f and the spring material 310. The space 312 may include an insulator material that is the same as or different from an insulator material included within the outer insulator sleeve 302. The retractable cable 116 can include any number of wires 304a-f, with any number of gauge sizes, in a balanced configuration around the spring material 310.

Figure 4:
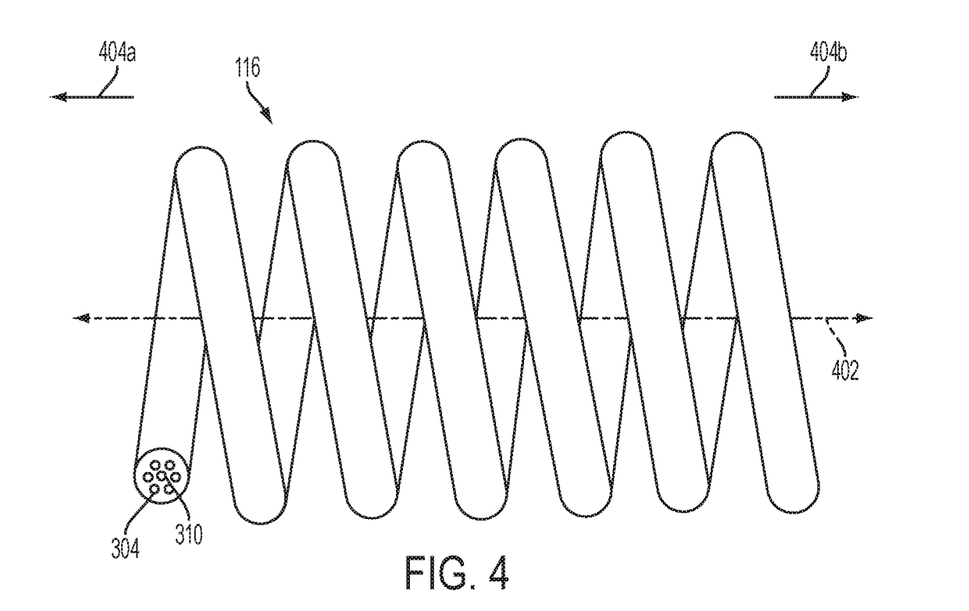
FIG. 4 is a diagram showing a cross-sectional side view of an expanded self-retractable coiled electrical cable according to one example.

The longitudinal length of the retractable cable 116 can be formed into a helical shape (e.g., around a center axis 402 as shown in FIG. 4). For example, the retractable cable 116 can be inserted into a coil-forming machine and manipulated into the helical shape. As the retractable cable 116 is formed into the helical shape, the wires 304 and spring material 310 internal to the retractable cable 116 also become helical shaped. When in the helical shape, the spring material 310 can act like a spring, allowing the retractable cable 116 to longitudinally expand, increasing the length of the retractable cable 116, and contract, decreasing the length of the retractable cable 116. In some examples, the retractable cable 116 may be able to longitudinally expand by five or more times its unexpanded length (i.e., its length at rest).

The spring material 310 can hold the retractable cable 116 in the helical shape. For example, as shown in FIG. 4, the spring material can hold the retractable cable 116 (e.g., the outer insulator sleeve) in the helical shape around a center axis 402. The spring material can hold the retractable cable 116 in the helical shape in resistance to one or more forces 404a, 404b being applied to the retractable cable 116 (e.g., to the ends of the retractable cable 116). In some examples, one or more of the forces 404a, 4046b can be axial forces and in a direction that is substantially parallel to the center axis 402.

Figure 5:
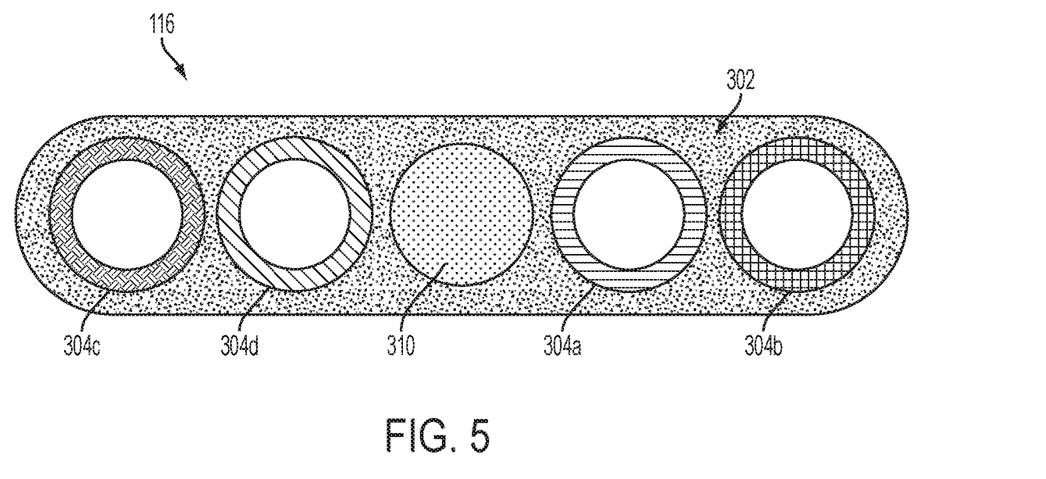
FIG. 5 is a diagram showing a cross-sectional end view of a flat self-retractable coiled electrical cable according to another example.

FIG. 5 is a cross-sectional end view of a self-retractable coiled electrical cable 116 according to another example. In this example, the cross-sectional end of the retractable cable 116 includes a flat (e.g., substantially rectangular) shape. The outer insulator sleeve 302 may be molded and/or formed into the flat shape. The retractable cable 116 may include multiple wires 304a-d in a balanced configuration on either side of the spring material 310.

Figure 6:
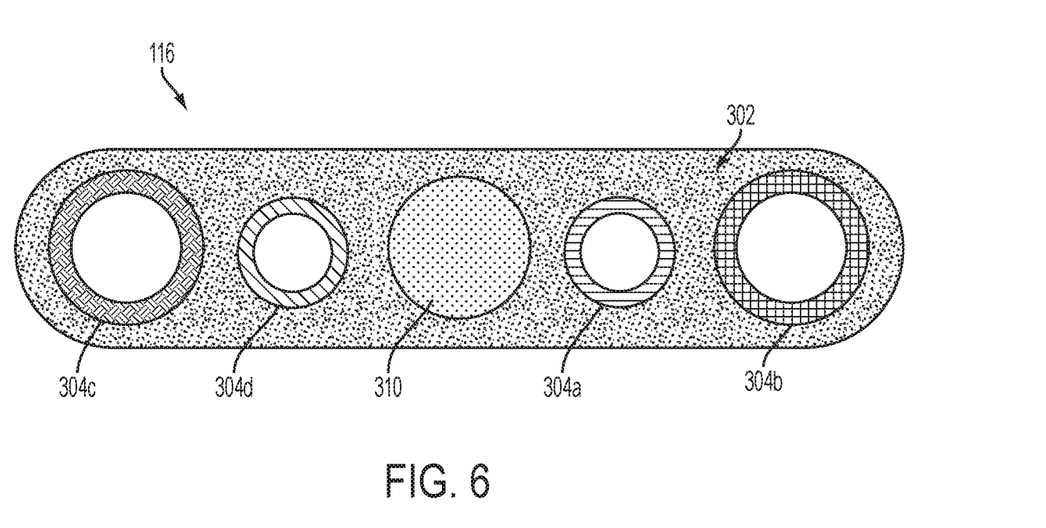
FIG. 6 is a diagram showing a cross-sectional end view of a flat self-retractable coiled electrical cable with wires with different gauge sizes according to another example.

As described above, the retractable cable 116 can include any number of wires 304a-d, with any number of gauge sizes, in any balanced configuration around the spring material 310. For example, as shown in FIG. 6, the retractable cable 116 may include two wires 304a, 304d which have a gauge size that is different from the gauge size of another two wires 304b, 304c. This may be unlike traditional retractable cables, which may be subject to design limitations in order to be able to expand and contract effectively. For example, to effectively expand and contract, the number of wires within the retractable cable may need to be limited, all of the wires may need to be the same gauge size, the gauge size may need to be relatively small (e.g., AWG 24-AWG 28), and/or the cross-sectional end shape of a traditional retractable cable may need to be circular (rather than flat).

Figure 7:
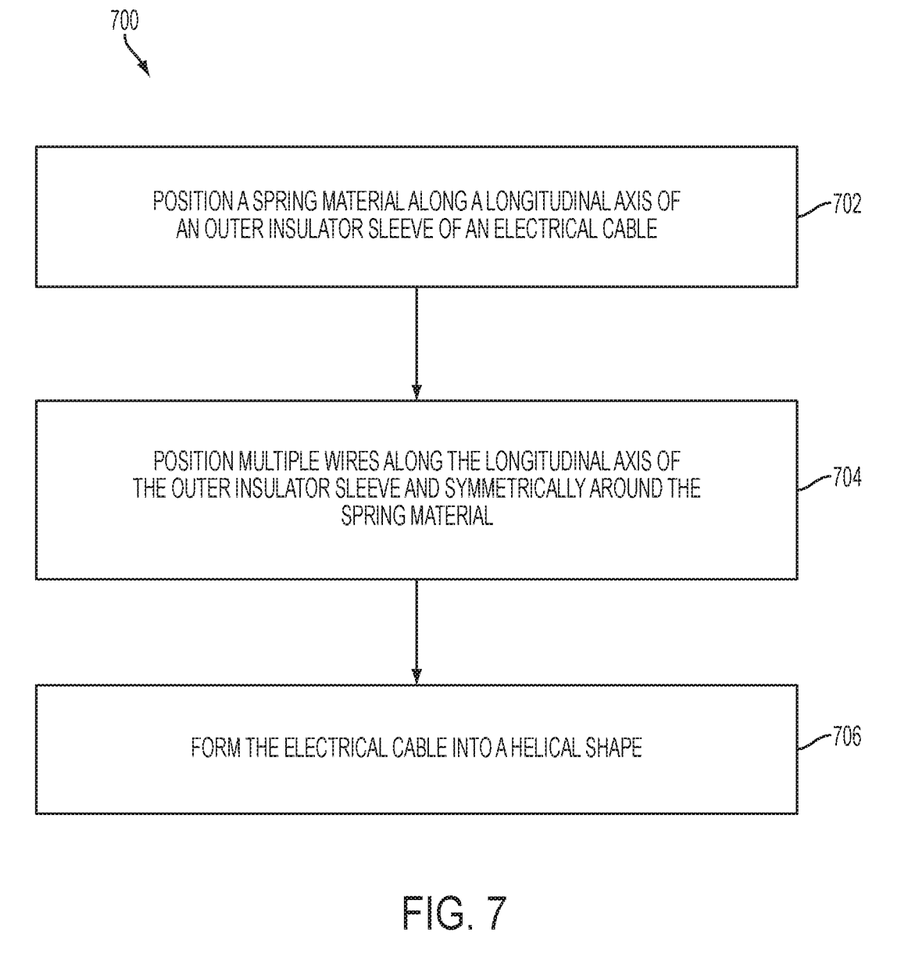
FIG. 7 is a flow chart showing an example process for making a self-retractable coiled electrical cable.

FIG. 7 is an example of a flow chart of a process 700 for making a self-retractable coiled electrical cable.

In block 702, a spring material is positioned along a longitudinal axis of an outer insulator sleeve of an electrical cable. The spring material can allow the electrical cable to expand upon an application of an axial force to an end of the electrical cable. The spring material can allow the electrical cable to retract upon a removal of the axial force from the end of the electrical cable.

The spring material can be positioned in the outer insulator sleeve by a human or by a machine. For example, a robot or other manufacturing device can position the spring material within the outer insulator sleeve.

In block 704, multiple wires are positioned along the longitudinal axis of the outer insulator sleeve. The wires can be positioned such that there is symmetry around all sides of the spring material. For example, the wires and the spring material can form a single row, with two wires positioned to the left of the spring material and two wires positioned to the right of the spring material (e.g., as shown in FIG. 5). The wires can be positioned in the outer insulator sleeve by a human or by a machine.

In block 706, the electrical cable is formed into a helical (e.g., coil) shape. In some examples, the electrical cable may be positioned in a coil-shaping machine, which can be actuated to form the shape of the electrical cable into the helical shape. In other examples, the electrical cable may be wound by hand to form the helical shape. The helical windings (e.g., coils) can be tightly wound or loosely wound.

In some aspects, a self-retractable coiled electrical cable is provided according to one or more of the following examples:

EXAMPLE #1

A self-retracting coiled cable can have a variable length along a center line. The self-retracting coiled cable can include an outer insulator sleeve having a longitudinal axis. The self-retracting coiled cable can also include a spring material extending along the longitudinal axis of the outer insulator sleeve. The spring material can hold the outer insulator sleeve in a helical shape around the center line in resistance to an axial force applied to the self-retracting coiled cable. The axial force can be substantially parallel to the center line. The spring material can allow the self-retracting coiled cable to expand upon an application of the axial force to an end of the self-retracting coiled cable, thereby increasing a length of the self-retracting coiled cable. The spring material can retract the self-retracting coiled cable upon a removal of the axial force from the end of the self-retracting coiled cable, thereby reducing the length of the self-retracting coiled cable. The self-retracting coiled cable can include multiple wires extending along the longitudinal axis of the outer insulator sleeve. The multiple wires can be disposed symmetrically around the spring material.

EXAMPLE #2

The self-retracting coiled cable of Example #1 may feature the self-retracting coiled cable being housed within a first well tool that is positionable in a wellbore. The first well tool can be movable between (i) a longitudinally retracted position and (ii) a longitudinally expanded position.

EXAMPLE #3

The self-retracting coiled cable of any of Examples #1-2 may feature the self-retracting coiled cable being coupled to a downhole connector operable to couple the self-retracting coiled cable to a second well tool.

EXAMPLE #4

The self-retracting coiled cable of Example #3 may feature the second well tool including a motor module, milling module, tube-cutting module, and/or key-shifting module.

EXAMPLE #5

The self-retracting coiled cable of any of Examples #3-4 may feature at least one of the multiple wires being operable for transmitting a communication signal between the first well tool and the second well tool.

EXAMPLE #6

The self-retracting coiled cable of any of Examples #2-5 may feature the first well tool including a ball screw threadably coupled to a ball nut. The ball screw can be operable to cause a downward movement of the ball nut with respect to a housing of the well tool. The downward movement can be operable to cause an interior mandrel to move the first well tool to the longitudinally expanded position.

EXAMPLE #7

The self-retracting coiled cable of any of Examples #1-6 may feature the outer insulator sleeve including a flat cross-sectional end shape. The self-retractable coiled cable may also feature the multiple wires and the spring material being positioned in a row.

EXAMPLE #8

The self-retracting coiled cable of any of Examples #1-7 may feature the outer insulator sleeve including a circular cross-sectional end shape. The self-retractable coiled cable may also feature the multiple wires being positioned in a circular configuration with each of the wires being equidistant from the spring material.

EXAMPLE #9

The self-retracting coiled cable of any of Examples #1-8 may feature at least two of the multiple wires having different gauge sizes.

EXAMPLE #10

The self-retracting coiled cable of any of Examples #1-9 may feature a space being positioned between the spring material and each of the multiple wires. The space can include an insulator material.

EXAMPLE #11

An assembly for use in a high-temperature environment that has a variable length along a center line can include an outer insulator sleeve. The outer insulator sleeve can have a longitudinal axis. The outer insulator sleeve can include a spring material extending along the longitudinal axis of the outer insulator sleeve. The spring material can allow the assembly to longitudinally expand and longitudinally contract while in the high-temperature environment. The outer insulator sleeve can also include multiple wires extending along the longitudinal axis of the outer insulator sleeve. The multiple wires can be disposed symmetrically around the spring material.

EXAMPLE #12

The assembly of Example #11 may feature the spring material holding the outer insulator sleeve in a helical shape around the center line in resistance to an axial force. The axial force can be applied to the assembly substantially parallel to the center line.

EXAMPLE #13

The assembly of any of Examples #11-12 may feature the assembly being housed within a first well tool that is positionable in a wellbore. The first well tool can be movable between (i) a longitudinally retracted position and (ii) a longitudinally expanded position.

EXAMPLE #14

The assembly of any of Examples #11-13 may feature a downhole connector operable to couple the self-retractable coiled cable to a second well tool.

EXAMPLE #15

The assembly of Example #14 may feature the second well tool including a motor module, milling module, tube-cutting module, and/or key-shifting module.

EXAMPLE #16

The assembly of any of Examples #12-15 may feature the first well tool including a ball screw threadably coupled to a ball nut. The ball screw can be operable to cause a downward movement of the ball nut with respect to a housing of the well tool. The downward movement can be operable to cause an interior mandrel to move the first well tool to the longitudinally expanded position.

EXAMPLE #17

The assembly of any of Examples #11-16 may feature the outer insulator sleeve including a flat cross-sectional end shape. The assembly may also feature the multiple wires and the spring material being positioned in a row.

EXAMPLE #18

The assembly of any of Examples #11-17 may feature at least two of the multiple wires including different gauge sizes.

EXAMPLE #19

The assembly of any of Examples #11-18 may feature a space being positioned between the spring material and each of the multiple wires. The space can include an insulator material.

EXAMPLE #20

A method can include positioning a spring material along a longitudinal axis of an outer insulator sleeve of an electrical cable. The spring material can allow the electrical cable to expand upon an application of an axial force to an end of the electric cable and retract upon a removal of the axial force from the end of the electrical cable. The method can also include positioning multiple wires along the longitudinal axis of the outer insulator sleeve and symmetrically around the spring material. The method can further include forming the electrical cable into a helical shape.

The foregoing description of certain embodiments, including illustrated embodiments, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A self-retracting coiled cable for use in a downhole environment, the self-retracting coiled cable having a variable length along a center line comprising:
    an outer insulator sleeve having a longitudinal axis;
    a spring material positioned within the outer insulator sleeve, the spring material extending within the outer insulator sleeve along the longitudinal axis of the outer insulator sleeve, the spring material holding the outer insulator sleeve in a helical shape around the center line
    the spring material allowing the self-retracting coiled cable to expand upon an application of an axial force to an end of the self-retracting coiled cable, thereby increasing a length of the self-retracting coiled cable, and the spring material providing a retractive force in opposition to the axial force for retracting the self-retracting coiled cable upon a removal of the axial force from the end of the self-retracting coiled cable, thereby reducing the length of the self-retracting coiled cable; and a plurality of wires extending along the longitudinal axis of the outer insulator sleeve, the plurality of wires disposed symmetrically around the spring material.

2. The self-retracting coiled cable of claim 1, wherein the self-retracting coiled cable is housed within a first well tool that is positionable in a wellbore, wherein the first well tool is moveable between (i) a longitudinally retracted position and (ii) a longitudinally expanded position.

3. The self-retracting coiled cable of claim 2, wherein the self-retracting coiled cable is coupled to a downhole connector operable to couple the self-retracting coiled cable to a second well tool.

4. The self-retracting coiled cable of claim 3, wherein the second well tool comprises a motor module, milling module, tube-cutting module, or key-shifting module.

5. The self-retracting coiled cable of claim 4, wherein at least one of the plurality of wires is operable for transmitting a communication signal between the first well tool and the second well tool.

6. The self-retracting coiled cable of claim 2, wherein the first well tool comprises a ball screw threadably coupled to a ball nut, the ball screw operable to cause a downward movement of the ball nut with respect to a housing of the first well tool, wherein the downward movement is operable to cause an interior mandrel to move the first well tool to the longitudinally expanded position.

7. The self-retracting coiled cable of claim 1, wherein the outer insulator sleeve comprises a flat cross-sectional end shape, and wherein the plurality of wires and the spring material are positioned in a row.

8. The self-retracting coiled cable of claim 1, wherein the outer insulator sleeve comprises a circular cross-sectional end shape, and wherein the plurality of wires are positioned in a circular configuration with each of the plurality of wires being equidistant from the spring material.

9. The self-retracting coiled cable of claim 1, wherein at least two of the plurality of wires comprise different gauge sizes.

10. The self-retracting coiled cable of claim 1, wherein a space comprising an insulator material is positioned between the spring material and each of the plurality of wires.

11. An assembly for use in a high-temperature environment, the assembly having a variable length along a center line and comprising:
an outer insulator sleeve having a longitudinal axis;
a spring material extending within the outer insulator sleeve along the longitudinal axis of the outer insulator sleeve, the spring material allowing the assembly to longitudinally expand and applying a force for longitudinally contracting the assembly into a helical shape while in the high-temperature environment; and
a plurality of wires extending along the longitudinal axis of the outer insulator sleeve, the plurality of wires disposed symmetrically around the spring material.

12. The assembly of claim 11, wherein the spring material holds the outer insulator sleeve in a helical shape around the center line in resistance to an axial force applied to the assembly substantially parallel to the center line.

13. The assembly of claim 11, wherein the assembly is housed within a first well tool that is positionable in a wellbore, wherein the first well tool is moveable between (i) a longitudinally retracted position and (ii) a longitudinally expanded position.

14. The assembly of claim 13, further comprising a downhole connector operable to couple the assembly to a second well tool.

15. The assembly of claim 14, wherein the second well tool comprises a motor module, milling module, tube-cutting module, or key-shifting module.

16. The assembly of claim 13, wherein the first well tool comprises a ball screw threadably coupled to a ball nut, the ball screw operable to cause a downward movement of the ball nut with respect to a housing of the first well tool, wherein the downward movement is operable to cause an interior mandrel to move the first well tool to the longitudinally expanded position.

17. The assembly of claim 11, wherein the outer insulator sleeve comprises a flat cross-sectional end shape, and wherein the plurality of wires and the spring material are positioned in a row.

18. The assembly of claim 11, wherein at least two of the plurality of wires comprise different gauge sizes.

19. The assembly of claim 11, wherein a space comprising an insulator material is positioned between the spring material and each of the plurality of wires.

20. A method comprising:
positioning a spring material within an outer insulator sleeve and along a longitudinal axis of the outer insulator sleeve of an electrical cable;
positioning a plurality of wires along the longitudinal axis of the outer insulator sleeve and symmetrically around the spring material; and
forming the electrical cable into a helical shape, wherein, the spring material allows the electrical cable to expand upon an application of an axial force to an end of the electrical cable and applies a force for retracting the electrical cable into the helical shape upon a removal of the axial force from the end of the electrical cable.

* * * * *